United States Patent Office 3,492,085
Patented Jan. 27, 1970

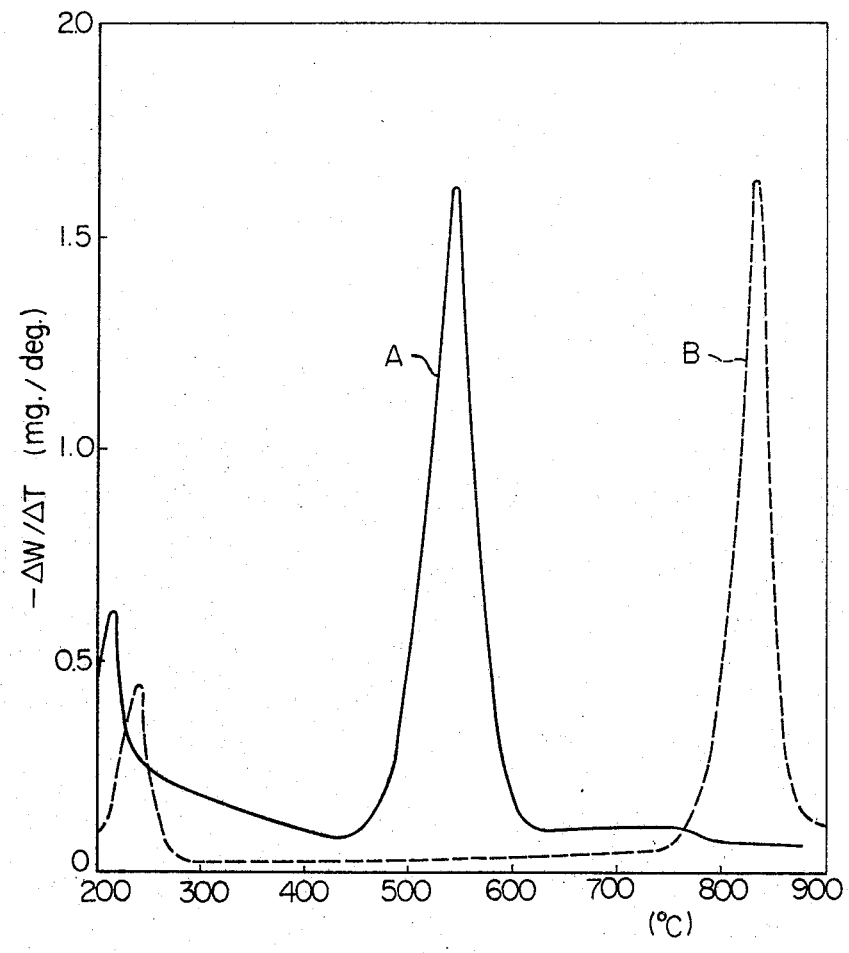

3,492,085
PROCESS FOR PREPARING TITANIUM HALIDES
Yujiro Sugahara, Tokyo, and Kouichi Usui, Hiroyuki Naito, and Akira Takahashi, Tsuruoka-shi, Japan, assignors to Mizusawa Kagaku Kogyo Kabushiki Kaisha, Imabashi, Higashi-ku, Osaka, Japan, a corporation of Japan
Filed Jan. 5, 1968, Ser. No. 696,046
Claims priority, application Japan, Jan. 10, 1967, 42/1,561
Int. Cl. C01g 23/02
U.S. Cl. 23—87       8 Claims

ABSTRACT OF THE DISCLOSURE

A process for preparing titanium halides which comprises mixing a hydrogel or xerogel of titanium salts of phosphorus oxoacids with at least one halide of an alkaline earth metal, heating said mixture in the solid phase in a non-oxidizing atmosphere at temperature ranging from 300° C. to a temperature where the mixture can maintain the solid state for a period of time sufficient to form a halide of titanium, and thereafter recovering the evolving vapor of the titanium halide.

---

This invention relates to a process for preparing titanium halides.

Heretofore, as a process for preparing titanium tetrachloride commercially, there has been known the so-called chlorination process wherein a high grade titanium are, e.g. rutile, or purified titanium dioxide is mixed with a carbon such as charcoal, coke, etc., and chlorine gas is passed therethrough (e.g., U.S. Patent 2,488,439). However, the foregoing process has shortcomings in that it requires the use of chlorine gas which is comparatively expensive and, in addition, that the titanium material used is restricted to the high grade titanium ores such as rutile. Further, the titanium tetrachloride that is obtained by this process contains a considerable amount of impurities and hence its purification is not necessarily a simple matter.

On the other hand, there has also been proposed a process of preparing titanium tetrachloride by introducing KCl and hydrogen chloride gas to a solution of titanium salt to form $K_2TiCl_6$ first and thereafter decomposing this at a temperature of 300° to 500° C. [Ind. Eng. Chem. 51 699 (1959)]. This process also has the shortcoming that the steps of separating and purifying the intermediately formed $K_2TiCl_6$ are exceedingly difficult.

Again, there has also been proposed a process of preparing titanium halides which comprises mixing the calcined product of phosphate of titanium with a halide of an alkaline earth metal followed by heating said mixture to a temperature of at least substantially as high as the melting point of the alkaline earth metal halide, and thereafter recovering the evolving vapor of titanium halide (British patent specification No. 692,901 and U.S. Patent 2,608,464). However, since it is necessary according to this process to heat the mixture of phosphate of titanium and the alkaline earth metal halide at a temperature exceeding the melting temperature of the alkaline earth metal halide, the whole mixture becomes a very viscous liquid or semi-solid state, with the consequence that a part of the titanium halide vapor which evolves becomes confined in the mixture and makes it difficult to obtain the titanium halide at a stoichiometric yield. Further, the reaction residue adheres to the reactor wall according to this process, and the removal of this residue becomes difficult. In addition, in the case of this prior art process, the reaction between the reactor wall and the alkaline earth metal halide becomes active due to the fact that the alkaline earth metal halide melts. Hence, the problem of the corrosion of the reaction vessel cannot be avoided.

We found that by using as the starting material either a hydrogel or xerogel of titanium salts of phosphorus oxoacids the reaction between the titanium salts of phosphorus oxoacids and the alkaline earth metal halides could be carried out at a temperature lower than the melting point of the alkaline earth metal halides while maintaining a completely solid phase state, with the consequence that not only could the titanium halides be obtained at stoichiometric yields but also all the shortcomings of the hereinbefore described prior art processes could be solved.

An object of the invention is to provide an improved process for preparing titanium halides, which comprises using as the starting material either a hydrogel or a xerogel of titaninm salts of phosphorus oxoacids and reacting said hydrogel or xerogel with alkaline earth metal halides in the solid phase state.

Another object is to provide a process by which titanium halides can be obtained at a very high purity by choosing as the titanium material the gels of titanium salts of phosphorus oxoacids, whose purification treatment is simple.

Still another object is to provide a process which makes it possible to prepare by means of a one-step reaction titanium iodide which is useful in the production of metallic titanium whose commercial production was relatively difficult in the past.

A further object is to provide a process by which titanium halides can be obtained in stoichiometrically good yield by means of a one-step reaction.

An additional object of the invention is to provide a process for preparing titanium halides wherein the handling of the reaction residue is simplified because the reaction is carried out by heating the mixture of solid materials in a completely solid phase, thus making it possible to prepare the titanium halides at relatively low cost.

The foregoing objects are achieved according to the invention by a process of preparing titanium halides which comprises mixing either a hydrogel or a xerogel of titanium salts of phosphorus oxoacids with alkaline earth metal halides followed by heating said mixture in the solid phase in a non-oxidizing atmosphere at temperatures ranging from 300° C. to a temperature where the mixture can maintain the solid state, namely at temperatures ranging from 300° C. to below the melting temperature of said alkaline earth metal halides for a period of time sufficient to form halides of titanium, and thereafter recovering the vapor of titanium halides which evolves.

In this invention, either the hydrogel or the xerogel of titanium salts of phosphorus oxoacids are used as the starting material. It is known that titanium orthophosphate can be prepared by adding either orthophosphoric acid or a water-soluble salt thereof to a sulfuric acid solution of titanium (e.g., British patent specification No. 261,051). The hydrogel or xerogel of titanium salts of phosphorus oxoacids as used in this invention can usually be prepared readily by reacting either an inorganic or organic acid solution of a titanium compound, a titanium salt per se or an amorphous titanium oxide with a phosphorus oxoacid or a phosphorus oxoacid derivative in the presence of water.

As the phosphorus oxoacids, any of the phosphorus oxoacids such, for example, as orthophosphoric acid ($H_3PO_4$), metaphosphoric acid ($HPO_3$), pyrophosphoric acid ($H_4P_2O_7$), hexamethaphosphoric acid [$(HPO_3)_6$], tripolyphosphoric acid ($H_5P_3O_{10}$), phosphorous acid ($H_3PO_3$) and hypophosphorous acid ($H_3PO_2$) can be used. Further, for imparting these phosphorus oxoacid components, the phosphorus oxoacid derivatives such as anhydrides (e.g., phosphorus pentoxide), halides, oxyhalides or the salts of alkali metals, alkaline earth metals, ammonium, zinc and aluminum of the foregoing phosphorus oxoacids can also be used.

The atomic ratio of titanium to phosphorus in the hydrogel or xerogel of titanium salts of phosphorus oxoacids may be in a broad range.

However, for recovering the titanium component in the hydrogel or xerogel of titanium salts of phosphorus oxoacids in good yield as halides, the proportion in which the phosphorus oxoacid component and the titanium component are contained in the gel of titanium salt of phosphorus oxoacid is preferably such that a balance is had with the amount used of the alkaline earth metal halide. Hence, if the titanium component in the gel of titanium salt of phosphorus oxoacid is expressed as $TiO_2$ and the phosphorus oxoacid component therein is expressed as $P_2O_5$, it is preferred that the $P_2O_5$ is contained in at least 0.1 mol, preferably at least 0.3 mol and not more than 3 mols, preferably not more than 2 mols, per mole of the $TiO_2$. Even in the foregoing range, the presence of the phosphorus oxoacid component in an excessively large amount is not only of no practical use in the formation of the titanium halides but is also a disadvantage from the economical standpoint. On the other hand, when the amount of the phosphorus oxoacid component is too small, there is a tendency to a decrease in the yield of the titanium halides. Hence, that in which the mole ratio of the phosphorus oxoacid component is in the range of $TiO_2:P_2O_5=1:0.5-1.5$ is most suitable.

While it is possible to use any of the gels of titanium salts of phosphorus oxoacids in this invention, as desired, that prepared in the manner disclosed in co-pending U.S. application Ser. No. 609,918, filed Jan. 19, 1967, by Yjiro Sugahara, Koichi Usui, Hiroyuki Naito and Masao Sakamoto, is to be particularly preferred. The gel of titanium salts of phosphorus oxoacids disclosed in the foregoing application is prepared in the following manner. An inorganic or organic acid solution of a titanium compound, a titanium salt per se, or an amorphous, titanium oxide, which contain impure metallic components, and either a phosphorous or a phosphorus oxoacid derivative which can form an phosphorus oxoacid radical under the reaction conditions are blended in the presence of water to form a stable sol or uniformly jellied masses predominantly of a titanium salt of phosphorus oxoacid, which is then molded into small mass of gels, after which the aforesaid impure metallic components are extracted.

If the hereinabove described method is followed, it becomes possible to obtain from titanium-containing minerals such as ilmenite, iron sand slag, rutile and high titanium slag a hydrogel or a xerogel of titanium salts of phosphorus oxoacids containing substantially no impure metallic components such as Fe, Mo, V, Co, Cr, Mn, Pb and Al even when such phosphorus oxoacid materials as crude phosphoric acid or phosphorus minerals which have received purification treatments are used. Hence, it is particularly desirable for producing titanium halides of high purity which do not require subsequent purification.

The term "hydrogel of titanium salts of phosphorus oxoacids," as used herein and in the appended claims, is meant to be the so-called water-containing gel or wet gel, or an imperfectly dried gel of these gels, which have been gelled while containing water or other aqueous media in an amount of not more than 98%. On the other hand, the term "xerogel of titanium salts of phosphorus oxoacids" is meant to be a gel obtained by drying the foregoing hydrogel at a temperature of less than 400° C., and preferably less than 250° C. It is important to use in this invention gels of titanium salts of phosphorus oxoacids which have not been calcined. Titanium salts of phosphorus oxoacids which have been obtained by calcining at temperature exceeding 400° C., e.g., 500° or 800° C., do not react to an appreciable degree with the halides of alkaline earth metals at temperatures below the melting point of said halides. The use of the hydrogel of titanium salts of phosphorus oxoacids is especially to be preferred in this invention.

According to the invention, the aforesaid hydrogel or xerogel of titanium salts of phosphorus oxoacids and an alkaline earth metal halide are formed into a solid phase mixture by intimately mixing the two together, following which this solid phase mixture is heated in a non-oxidizing atmosphere at a temperature lower than the melting point of the halide. By proceeding in this manner, the gel of titanium salts of phosphorus oxoacid and the alkaline earth metal halide goes through a complex solid phase reaction to form a titanium halide.

The halides of alkaline earth metals which can be used in the invention include the halides of Mg, Ca, Ba, or Sr, and conveniently used are the chlorides, bromides or iodides of these metals, or a mixture of these halides. All of these react with the gels of the titanium salts of phosphorus oxoacids.

Further, according to the invention method, it is preferred that of the foregoing metal halides those inorganic halides whose volatility is small are chosen and used.

Again, as the inorganic halides, those containing either chlorine, bromine or iodine are to be preferred. It is, of course, possible to use the fluorine-containing salts, but they are undesirable in that they corrode the apparatus.

Specific examples of the hereinbefore described inorganic halides include the halides such as $MgCl_2$, $MgBr_2$, $MgI_2$, $CaCl_2$, $CaBr_2$, $CaI_2$, $BaCl_2$, $BaBr_2$ and $BaI_2$, and the hydroxy halides such as $Mg(OH)Cl$. From the standpoint of their availability at low cost and the ease with which the reaction can be carried out by their use, the halides of calcium, particularly $CaCl_2$, $CaBr_2$ and $CaI_2$, are convenient.

According to the invention, the gel of titanium salts of phosphorus oxoacids is blended with the alkaline earth metal halide to form a solid phase blend. In this case when the two starting materials are solids, an intimate mixture can be obtained by dry blending of powders of the two components or comminution of the two components. Again, the two starting materials can be wet and blended comminuted using a liquid medium. In this case, the inorganic halide can be first dissolved in a liquid medium, then blended with a xerogel of titanium salts of phosphorus oxoacids, and thereafter the mixture can be dried at a temperature not exceeding 400° C., and preferably not exceeding 250° C., to obtain a solid blend. Further, in the case where a hydrogel, i.e., a water-containing gel, of titanium salts of phosphorus oxoacids is used, this can be blended with the inorganic halide to form a pasty mixture, which is thereafter dried at a temperature not exceeding 400° C., and preferably not exceeding 250° C. In the said process, intimate mixtures of a hydrogel or xerogel of a titanium salt of a phosphorus oxoacid with an alkaline earth metal halide may be formed by using instead of the hydrogen of said titanium salt a hydrosol of said titanium salt in which said titanium salt particles are uniformly dispersed in an aqueous medium, mixing said hydrosol with an alkaline earth metal halide and thereafter drying the mixture. In either of these cases, these blends can be molded in advance into small masses of optional form such as sheets, pellets, spheres or tablets. The molding of the blend in advance into small aggregates is desirable for improving the circulation of the resulting titanium halide gas.

Alternatively, the hydrogel, i.e., the water-containing gel, of titanium salts of phosphorus oxoacids can be dipped in a concentrated aqueous solution of the aforesaid halide to effect the impregnation of said gel with the alkaline earth metal halide followed by drying at a temperature not exceeding 400° C., and preferably not exceeding 250° C., thereby forming the solid intimately mixed blend in the form of small aggregates.

The proportion in which the gel of titanium salts of phosphorus oxoacids and the alkaline earth metal halide are mixed can be varied over a broad range. However, for improving the yield of the titanium halide it is preferred that the alkaline earth metal halide be used in an amount such that the amount of the halogen atom becomes at least 4 atomic equivalents per atom of titanium contained in the gel of titanium salts of phosphorus oxoacids. In addition, it is preferred that the alkaline earth metal halide be used in an amount in excess of its stoichiometric quantity for enhancing the reaction speed.

According to the invention process, the solid phase mixture of the hydrogel or xerogel of titanium salts of phosphorus oxoacids and the alkaline earth metal halide is heated in a non-oxidizing atmosphere at a temperature lower than the melting point of said alkaline earth metal halide. As the non-oxidizing atmosphere, any can be employed so long as it does not liberate oxygen under the reaction conditions. For example, atmospheres of such as nitrogen, argon hydrogen, carbon dioxide, carbon monoxide, halogen, e.g., chlorine and bromine and gaseous hydrocarbons as methane, or vacuum are suitable non-oxidizing atmospheres for use in the invention process.

According to the invention, in consequence of the use of the hydrogel or xerogel of titanium salts of phosphorus oxoacids, the formation of titanium halides can be fully accomplished even when the hereinbelow described solid phase mixture is heated at a temperature below the melting point of the alkaline earth metal halides. Now, the melting points of the alkaline earth metal halides are as follows:

|  | ° C. |
| --- | --- |
| $MgCl_2$ | 712 |
| $MgBr_2$ | 711 |
| $MgI_2$ | 650 |
| $CaCl_2$ | 772 |
| $CaBr_2$ | 760 |
| $CaI_2$ | 575 |
| $BaCl_2$ | 962 |
| $SrCl_2$ | 873 |

At temperatures below 300° C., either the reaction does not proceed at all or, even though it proceeds, the reaction speed is slow, and hence it is not of practical use. In this invention it is preferred from the standpoint of the speed of recovery of the titanium halide that a heating temperature of at least 400° C. is used. On the other hand, the use of a temperature exceeding the hereinabove given melting points of the alkaline earth metal halides is undesirable since, as previously noted, the solid phase mixture becomes a viscous liquid or semi-solid state to bring about a reduction in the yield of the titanium halides as well as cause such troubles as corrosion of the reaction vessel and difficulty as to the removal of the reaction residues.

That the yield of titanium halide is exceedingly high when, as in the invention, the reaction is carried out by heating the aforesaid solid phase mixture at a temperature lower than the melting point of either of the reactants and the two reactants are held completely in the solid phase state as compared with the instance where the reaction is carried out at a temperature higher than the melting point of one of the reactants, i.e., the alkaline earth metal halide, is a truly unexpected occurrence when considered in the light of the heretofore held common knowledge that the reaction in the solid phase proceeds rather in a non-uniform manner.

In the present invention, the reaction of a titanium salt of a phosphorus oxoacid with an alkaline earth metal halide can be carried out sufficiently at a temperature lower than the melting point of said halide. Even if at the point where the reaction is substantially completed the temperature of the reaction residue is further heated to a temperature higher than the melting point of said halide, the invention process is free of the above-mentioned troubles because it is not said halide per se but the reaction residue of a higher melting point that is present in the reaction vessel.

In order to better understanding this invention, please refer to the accompanying drawing.

A diagram comparing difference in reaction temperature of the process of this invention from a known process by thermobalance analysis.

As materials, both of A: a mixture obtained by intimately mixing hydrogel of titanium phosphate prepared in accordance with a process described in Example 1 with calcium chloride and drying and B: a mixture obtained by intimately mixing titanium phosphate calcined to 900° C. Used in a comparative example hereinafter described in Example 7 and drying are used; 0.35 g. of each of said A and B is taken in a test sample basket of a thermobalance, into a sample chamber inside a furnace, argon gas is fed at a rate of 120 cc./hr. as a carrier gas, temperature of the furnace is raised at a ratio of 4° C./min., a reduced amount of the weight at each temperature is checked to calculate differential ratio of weight reduction at each increment of temperature, $-\Delta W/\Delta T$ (mg./deg.) which is plotted and shown.

As will be apparent from this drawing, in case hydrogel of titanium phosphate is made a material, reduction of the weight due to production of $TiCl_4$ owing to reaction of the halide starts from the vicinity of 450° C., reaching a peak in the vicinity of 540° C. and the reaction completes at about 600° C. In contrast thereto, in case calcined titanium phosphate is made a material, from the vicinity of 750° C. close to melting point (772° C.) of the reacted halide (calcium chloride), production of $TiCl_4$ is recognized and with about 810° C. as a peak the reaction completes in the vicinity of 880° C. Thus, it is understood that depending upon properties of titanium phosphate, the reaction temperature is shown having a clear difference before and after melting point of the reacted halide.

The reaction between the gel of titanium salts of phosphorus oxoacids and the inorganic halide in the invention is believed to be a double decomposition reaction in the solid phase, and thus the titanium halide is formed in a high yield of as high as 98% and a by-product consisting predominantly of the alkaline earth metal salt of the phosphorus oxoacid and some halogen is produced.

In general, the amount of the by-product halogen tends to increase concomitantly as the inorganic halide is increased beyond its equivalent, based on the titanium component.

While the residue predominantly of the alkaline earth metal salt of the phorsphorus oxoacid, which is formed as a by-product in the hereinbefore described reaction, varies considerably in its composition depending upon the gel of titanium salts of phosphorus oxoacids and the inorganic halide used and their proportion as well as the reaction conditions employed, generally speaking, it is a complex compostion which is predominantly a salt of the alkaline earth metal and the phosphorus oxoacid component, wherein are contained a small amount of unreacted matter and/or the apatite series. As previously noted, when the titanium component in the titanium salt of phosphorus oxoacid is present therein in a proportion exceeding its stoichiometric quantity as compared with the phosphorus oxoacid component, there is a tendency that the titanium component of the titanium salts of phosphorus oxoacids to remain behind in the aforesaid residue as titanium dioxide. Hence, according to the invention process, the residue which is formed as a by-product and which consists predominantly of the alkaline earth metal salt of the phosphorus oxoacid can be purified by the recrystallization technique or other customary purification methods to obtain a product which is a pure alkaline earth metal salt of the phosphorus oxoacid. Further, the phosphorus oxoacid itself can also be recovered. Again, if desired, the titanium dioxide contained in the residue can also be recovered.

Important advantages of the invention process resides in the fact that the starting materials being solids are very easily handled and heated, that the product being obtained as a vapor is easily recovered and separated, and moreover that the reaction residue not adhering to the wall of the reaction vessel is readily removed. As a consequence, in practicing the invention, the reaction apparatus not only can be reduced to a very small size, but also the expense required for heating can be reduced. Hence, it becomes possible to provide titanium halides at a relatively low production cost.

According to the invention process, the gel of titanium salts of phosphorus oxoacids and the alkaline earth metal halides are thus double decomposed into titanium halides and said metal salts of phosphorus oxoacids. In this case, since the titanium salts of phosphorus oxoacids are obtained as a solid residue and the titanium halides usually evolve as a gas, the titanium halides can be recovered by the recovery operations well known in the art.

For recovering the gaseous titanium halides with high efficiency, the previously noted non-oxidizing gases such as $N_2$, Ar, $Cl_2$, $CO_2$ and CO are preferably introduced into the reaction vessel as a carrier. As the reaction vessel the conventional batch-wise or continuous type heating furnaces such as the crucible furnace, fixed or moving bed type or fluidized bed type heating furnace, rotary kiln, vertical furnace, and flash roasters can be used. The titanium halide vapor can be recovered as a liquid or solid by cooling to, say, a temperature ranging from $-50°$ C. to room temperature, using an optional coolant.

The thus recovered titanium halides can be used for various purposes in either their as-obtained state or, if desired, after being submitted to customary purification treatments.

However, when the hereinbefore described gels of titanium salts of phosphorus oxoacids containing substantially no impure metallic constituents and the purified inorganic halides are used in accordance with the preferred mode of the invention method, titanium halides containing substantially no impure metallic constituents are recovered. Hence, the purification treatment of these halides is usually not required.

Actually, by choosing in accordance with the hereinabove described process of this invention a gel of titanium salts of phosphorus oxoacids whose extraction and separation of the impure metallic constituents is very easy, the titanium halides as-obtained contain the impure metallic constituents, such as Fe, Mo, V, Co, Cr, Mn, Pb, and Al, in only an amount such as to be impossible of detection by means of emission analysis, e.g., not more than 1.0–0.1 p.p.m.

Therefore, the titanium chloride, titanium bromide and titanium iodide obtained by the process of this invention are especially excellent for use as high purity starting materials of metallic titanium Further, they can also be used as Ziegler catalyst and chemical reagents. In addition, the titanium tetrachloride obtained by the invention process can also be converted by known procedures to either the rutile or anatase type titanium dioxide excelling in whiteness and covering power.

The following non-limitative examples are given for further illustrating the invention.

EXAMPLE 1

This example illustrates the procedure for producing titanium tetrachloride from calcium chloride and a hydrogel of titanium phosphate prepared from iron sand slag.

(A) Preparation of titanium phosphate hydrogel

One kg. of iron said slag powder, 1 liter of concentrated sulfuric acid and 2 liters of water are mixed and then heated for about 1 hour. After completion of the reaction, the resulting solution is diluted with water, after which the unreacted matter, silicic acid portion and gypsum formed are separated by filtration and a sulfuric acid solution of titanium salts is recovered, the composition of which is as follows:

| | G./100 ml. |
|---|---|
| $TiO_2$ | 8.55 |
| $Ti_2O_3$ | 0.148 |
| $Fe_2O_3$ | 1.49 |
| $Al_2O_3$ | 3.23 |
| MgO | 1.39 |
| $V_2O_5$ | 0.0454 |
| $Cr_2O_3$ | 0.0022 |
| Mn | 0.338 |
| Free $H_2SO_4$ | 1.53 |
| Specific gravity (20° C.) | 1.40 |

To 1000 ml. of the sulfuric acid solution of titanium salts of the foregoing composition are added 150 ml. of commercial first grade orthophosphoric acid (sp. gr. 1.690, $H_3PO_4$ 85.0%) with stirring at room temperature to form a homogeneous sol-like blend. When this is allowed to stand for about one hour, a jelled mass of a black-purple gel predominantly of titanium phosphate hydrogel is obtained, which is hardened to such degree that its hardness can be felt when pressed with the fingers. This jellied mass is molded into cylindrical-shape about 1.5 mm. in diameter. The so molded small mass of gel is placed in a washing tower, and the extraction and separation of the impure metallic constituents contained in the small mass of gel is carried out using first a sulfuric acid solution of pH 0.5 and then a sulfuric acid solution of a concentration of 30 g./100 ml. followed by washing with water. When the so obtained wet gel is removed of its adhering water by means of a hydraulic press, a wet gel of titanium phosphate containing substantially no impure metallic constituents is obtained at a high yield of 99%, based on the titanium content of the titanium salt solution.

When the impure metallic constituents in the resulting gel of titanium phosphate were analyzed using an emission spectrophotometer, it could be seen that the so-called impure metallic constituents, i.e., vanadium, iron, aluminum and lead, were not substantially contained in the gel. Further, when this titanium phosphate gel was analyzed as to its composition, the mole ratio of $TiO_2:P_2O_5$ was 1.51:1, while the water content of this wet gel of titanium phosphate (dried for 3 hours at 110° C.) was 74%.

(B) Reaction of the titanium phosphate hydrogel with calcium chloride in an argon (Ar) gas atmosphere One hundred grams of the substantially purified titanium phosphate hydrogel prepared by the hereinabove described procedure and 50 grams of calcium chloride ($CaCl_2 \cdot 2H_2O$) purified by the recrystallization technique are blended fully intimately in a mortar. What is convenient in this case is the fact that the water contained in the titanium phosphate hydrogel and the crystalline water of the calcium chloride act as the blending medium, with the consequence that the two components are intimately blended into a pasty form. When this intimate blend is placed in a tray and thoroughly dried in a 200° C. dryer, the blend is converted in small flaky aggregates. In the case of this blend, the $CaCl_2$ is mixed with the 1.5 $TiO_2 \cdot P_2O_5$ in a mole ratio of about 3 moles of the former to one mole of the latter.

As the reaction apparatus, a quartz tube 3 cm. in diameter and 30 cm. long is used, in which at a point about 10 cm. from the bottom is disposed a perforated plate, upon which the aggregate blend obtained hereinbefore is adapted to be deposited. The top of the quartz tube is fitted with a ground glass cover equipped with a protective tube wherein can be inserted a thermocouple for determining the temperature, and a duct (diameter about 1 cm.) by means of which gas can be either introduced from the outside or discharged from the inside. A gas duct (diameter about 1 cm.) is also provided at the bottom. Nichrome wire is wound about the outside of the quartz tube which constitutes the reaction tube and heating up to 1100° C. is thus made possible. Further, as additional equipment a heating apparatus for preheating the gas to be used in the reaction and an apparatus for cooling the gas evolving as the reaction product are disposed, and the complete apparatus is used as a vertical type reaction apparatus.

Thirty grams of the flaky blend of the aforesaid titanium phosphate gel and calcium chloride are deposited atop the perforated plate of the reaction tube of the reaction apparatus, and dried argon (Ar) gas is introduced via the top gas duct at the rate of about 150 cc. per minute. The mixture is first preheated for 20 minutes at 200° C. in this state to completely eliminate the water contained in the mixture. Next, the apparatus connected to the lower end of the reaction tube and adapted to collect the reaction product is thoroughly cooled, that part consisting of a coil type cooling tube being cooled with 3–5° C. cooling water while the trap provided therebelow is cooled with Dry Ice. When the heating temperature of the reaction tube is raised after having thoroughly cooled the aforesaid condenser, titanium tetrachloride gradually begins to evolve at about 380° C. and at about 500° C., the evolution of the titanium tetrachloride becomes vigorous. When the temperature of 500–550° C. (M.P. of $CaCl_2$ 772° C.) is maintained for 1.5 hours, the reaction is completed and the titanium tetrachloride is condensed in the cooled trap as a colorless liquid.

(C) Resulting product

When the composition of the here obtained titanium tetrachloride was analyzed, the atomic ratio of Ti:Cl was 1:4.34 and the yield was 95.1%, based on the titanium content of the starting titanium phosphate. That the atomic ratio of chlorine was greater than 4 is believed to be due to the fact that free chlorine was evolved.

On the other hand, when the amount of impurities contained in the resulting titanium tetrachloride were determined and compared with that of the commercial first grade reagent titanium tetrachloride, using an emission spectrophotometer, it was found that whereas the titanium tetrachloride obtained in the present example contained substantially no impure metallic constituents such as vanadium and iron, the commercially available reagent contained such as the vanadium constituent. It can thus be seen that the titanium tetrachloride obtained in accordance with the present example is superior in its purity than the commercially available reagent titanium tetrachloride.

Further, in the reaction tube there remains behind unreacted calcium chloride and apatite $[Ca_5Cl(PO_4)_3]$ which is predominantly calcium phosphate, a reaction product of the phosphoric acid portion of the titanium phosphate and the calcium portion of the calcium chloride (result of X-ray diffraction). This can be utilized as a phosphatic material for the production of titanium phosphate and for other purposes.

EXAMPLE 2

This example illustrates the method of producing titanium tetrabromide from calcium bromide and a titanium phosphate prepared from ilmenite.

(A) Preparation of the titanium phosphate hydrogel 0.5 liter of water is added to 1 kg. of ilmenite thoroughly pulverized and passing a 300-mesh sieve, and the mixture is prepared into a slurry with stirring. Next, 1.2 kg. of concentrated sulfuric acid is added to the slurry, which is then heated for 2 hours at a maximum temperature of 140° C. After completion of the reaction and while the slurry still has a gruel-like fluidity it is diluted with water. The unreacted matter is separated by filtration and a sulfuric acid solution of titanium salt is recovered at a recovery rate of about 90%. This is followed by cooling the solution to eliminate the iron content as crystals of $FeSO_4 \cdot 7H_2O$.

The composition of the so obtained sulfuric acid solution of titanium salt is as follows:

|  | G./100 ml. |
|---|---|
| $TiO_2$ | 25.6 |
| $Fe_2O_3$ | 16.2 |
| $Al_2O_3$ | 2.02 |
| $MgO$ | 1.80 |
| $V_2O_3$ | 0.040 |
| $Cr_2O_3$ | 0.0022 |
| Mn | 0.18 |
| Free $H_2SO_4$ | 18.4 |

To 1000 ml. of the sulfuric acid solution of titanium salt of the foregoing composition are added 450 ml. of commercial first grade orthophosphoric acid (sp. gr. 1.690, $H_3PO_4$ 85.0%) with stirring at room temperature to form a sol-like blend. When this sol-like blend is poured into a tray and heated, a semi-dried flaky gel predominantly of titanium phosphate is obtained. This small aggregate gel is placed in a washing tower, and the extraction and separation of the impure metallic constituents contained in the gel is carried out using a pH 0.5 sulfuric acid solution and a sulfuric acid solution of 30 g./100 ml. concentration followed by washing with water. When the so obtained wet gel is removed of its adhering water by means of a hydraulic press, a wet gel of titanium phosphate substantially free of impure metallic constituents is obtained at a high yield of 98.7%, based on the titanium content of the titanium salt solution. When the impure metallic constituents in the resulting gel of titanium phosphate were analyzed using an emission spectrophotometer, it can be seen that the so-called impure metallic constituents, i.e., vanadium, iron, aluminum and lead, were not substantially contained in the gel. Further, when this titanium phosphate gel was analyzed as to its composition, the mole ratio of $TiO_2:P_2O_5$ was 1.47:1, while the water content of this wet gel of titanium phosphate (dried for 3 hours at 110° C.) was 77.5%.

(B) Reaction of the titanium phosphate hydrogel with calcium bromide in an argon (Ar) atmosphere One hundred grams of the substantially purified titanium phosphate hydrogel prepared by the hereinbefore described procedure and 100 grams of first grade reagent calcium bromide ($CaBr_2 \cdot 3H_2O$) are thoroughly and intimately blended in a mortar to obtain a pasty blend. This blend is placed in a tray and dried at a low temperature of about 80° C., thereby converting it into small flaky aggregates. In the case of this blend, the $CaBr_2$ is mixed with the 1.5 $TiO_2 \cdot P_2O_5$ in a mole ratio of 3 moles of the former to one mole of the latter.

Thirty grams of this small aggregate blend are deposited on the perforated plate of the reaction tube described in section B of Example 1, and dried argon (Ar) gas is introduced via the top gas duct at the rate of about 150 cc. per minute. The mixture is first preheated for 15 minutes at 100° C. in this state to eliminate the water remaining in the mixture. Next, when the heating temperature of the reaction tube is raised after connecting to its bottom an apparatus for collecting the reaction product, as used in Example 1, the evolution of bromine gas is observed at about 200° C. When the temperature is raised still further and about 450° C. is reached, the evolution of orange colored titanium tetrabromide begins and at about 500° C. the evolution of titanium tetrabromide becomes vigorous. When the temperature of 500° C. (M.P. of $CaBr_2$ is 760° C.) is maintained for 2 hours, the reaction is completed, and the titanium tetrabromide is condensed in the cooled trap as dark orange colored crystals.

(C) Resulting product

When the resulting titanium tetrabromide was analyzed as to its composition, the atomic ratio of Ti:Br was 1:4.31 and its yield was 94.9% based on the titanium content of the starting titanium phosphate. Further, when the impurities contained in the resulting titanium tetrabromide were determined using an emission spectrophotometer, it can be seen that substantially no impure metallic constituents such as vanadium, iron, etc., were present.

Further, calcium phosphate and unreacted material remained in the reaction tube (results of X-ray diffraction). These can be utilized as starting materials for the production of titanium phosphate and for other purposes.

EXAMPLE 3

This example illustrates the method of producing titanium tetraiodide from calcium iodide and a titanium phosphate hydrogel prepared from ilmenite.

(A) Preparation of the titanium phosphate hydrogel

The substantially purified titanium phosphate prepared by the procedure described in section A of Example 2 was used.

(B) Reaction of the titanium phosphate hydrogel with calcium iodide in an argon (Ar) gas atmosphere One hundred grams of the aforesaid substantially purified wet gel of titanium salt (water content 77.5%) and 158 grams of first grade reagent calcium iodide ($CaI_2 \cdot 6H_2O$) are fully intimately blended in a mortar to obtain a pasty blend. This blend is so mixed that the mole ratio of $CaI_2$ to 1.5 $TiO_2 \cdot P_2O_5$ is 3:1. After drying this blend in a vacuum desiccator containing a desiccant of phosphorus pentoxide, it is broken into small aggregates, after which 30 grams thereof are deposited on the perforated plate of the reaction tube described in section B of Example 1. This is followed by introducing dried argon (Ar) gas via of the top gas duct at the rate of about 150 cc. per minute. After passing the argon gas for 20 minutes at room temperature in this state, the apparatus for collecting the reaction, as described in Example 1, is connected to the bottom of the reaction tube. When the heating temperature of the reaction tube is then raised, free iodine evolves beginning at a temperature of about 150° C. When the temperature is raised still further, titanium tetraiodide of deep red color starts evolving at a temperature of about 400° C. and the evolution of the titanium tetraiodide becomes vigorous from about 500° C. When the temperature of 550° C. (M.P. of $CaI_2$ is 575° C.) is maintained for 2 hours, the reaction is completed, and in the cooled trap is collected the red titanium tetraiodide as instable crystals.

(C) Resulting product

When the here obtained titanium tetraiodide was analyzed as to its composition, the atomic ratio of Ti:I was 1:4.52 and the yield, based on the titanium content of the starting titanium phosphate, was 90.5%. Further, when the impurities contained in the resulting titanium tetraiodide were determined using an emisson spectrophotometer, impure metallic constituents such as vanadium and iron were not substantially contained therein. It thus can be seen that it is especially suitable for use as the starting material of metallic titanium.

Further, it was observed that calcium phosphate and unreacted material remained behind in the reaction tube.

EXAMPLE 4

This example illustrates the process for preparing a halide of titanium from calcium halide and a xerogel of titanium phosphate.

(A) Preparation of the xerogel of titanium phosphate

A substantially purified wet gel of titanium phosphate is prepared in accordance with the procedure described in section A of Example 1, after which the so obtained wet gel is dried for 3 hours to obtain a xerogel of titanium phosphate.

(B) Reaction of calcium halide and the xerogel of titanium phosphate in a nitrogen ($N_2$) gas atmosphere The substantially purified xerogel of titanium phosphate, prepared by the hereinbefore described procedure, and the calcium chloride, calcium bromide and calcium iodide used respectively in Examples 1, 2 and 3 are each mixed in a ratio of one mole of the former to a little more than 3 moles of the latter and blended intimately in a mortar. Each of these blends are dried at a low temperature of 60–80° C., then formed into small flaky aggregates, following which each are reacted using the reaction tube described in section B of Example 1. The reaction is carried out by passing through at the rate of about 150 cc. per minute nitrogen ($N_2$) gas as the carrier gas and raising the temperature gradually. When the reaction conditions indicated in Table I, below, are maintained, halides of titanium of the following composition are recovered in the respective cooled traps as either a liquid or instable crystals at the yields indicated in the following table.

TABLE I

| Calcium halide used | Reaction Conditions (° C. x hr.) | Yield (percent) | Composition (atomic ratio) of recovered titanium halide Ti:X |
|---|---|---|---|
| Calcium chloride | 550 x 2 | 92.5 | 1:4.32 |
| Calcium bromide | 550 x 2 | 93.5 | 1:4.35 |
| Calcium iodide | 550 x 2 | 90.5 | 1:4.50 |

It is seen from the foregoing results that halides of titanium can also be recovered satisfactorily when the xerogel of titanium phosphate is used as the starting material.

EXAMPLE 5

This example illustrates the process for producing titanium tetrachloride from calcium chloride and hydrogels of titanium salts of phosphorus oxoacids prepared using various phosphorus oxoacids or their derivatives as the starting materials.

(A) Preparation of the various hydrogels of titanium salts of phosphorus oxoacids The amount of free sulfuric acid of the sulfuric acid solution of titanium salts recovered by the procedure described in Example 1 is adusted to about 100 grams per 100 ml. The various phosphorus oxoacids or their derivatives indicated in Table II are added to the foregoing solution in amounts corresponding to one mole calculated as $P_2O_5$ per mole of the titanium in said solution (as $TiO_2$). After obtaining a homogeneous liquid blend, the several blends are formed into small aggregate gels. This is followed by extraction and separation of the impure metallic constituents that are contained in the blends by using sulfuric acid solutions of a pH 0.5 and a concentration 30 grams/100 ml. followed by washing with water, thus preparing the substantially purified hydrogels of titanium salts of phosphorus oxoacids.

When a phosphate rock was chosen as the oxoacid salt of phosphorus that was produced in Florida, U.S.A., it was used after the acid-insoluble foreign matter was removed therefrom by elutriation after it had been thoroughly wet comminuted. Its principal constituents were $P_2O_5$ 35.6%, $Fe_2O_3$ 0.61%, $Al_2O_3$ 1.44%, $CaO$ 50.4%, $MgO$ 0.87%, F 3.90% and $SiO_2$ 4.50%.

Further, when phosphate rocks or other oxoacid salts of phosphorus were used, an acid, say, sulfuric acid, was added in advance in an amount equivalent or greater than that of the oxoacid salts of phosphorus.

On the other hand, as the crude phosphoric acid solution was used an unpurified phosphoric acid solution which was prepared by treating with sulfuric acid a phosphorus mineral produced in Kola, U.S.S.R. Its principal constituents expressed in grams per 100 ml. were $P_2O_5$ 34.9, MgO 0.13, $Fe_2O_3$ 0.53, $Al_2O_3$ 0.58 and F. 0.27.

Further, when the gels predominantly of titanium salts of phosphorus oxoacids were prepared using as starting materials phosphate rock, calcium phosphate and crude phosphorus mineral, a hydrochloric acid solution of pH 0.5 was used as the extracting solvent in extracting and separating the impure metallic constituents contained in the materials.

When the impurities contained in the here prepared several hydrogels of titanium salts of phosphorus oxoacids were analyzed with an emission spectrophotometer, it was found that the impurities such as vanadium, iron, aluminum and lead had been substantially removed from all of the gels.

(B) Reaction of calcium chloride with the several hydrogels of titanium salts of phosphorus oxoacids Using water as the mixing medium, the substantially purified hydrogels of titanium salts of phosphorus oxoacids prepared by the hereinbefore described procedure and calcium chloride ($CaCl_2 \cdot 2H_2O$) purified by the recrystallization technique are intimately mixed such that the mole ratio would become 2 moles of the latter to one mole of the titanium portion (as $TiO_2$) contained in the former. This is followed by drying the mixtures thoroughly in a 100° C. dryer and then forming the mixtures into small flaky aggregates.

Thereafter, the operation described in section B of Example 1 is followed, the reaction being carried out by preheating the mixtures at 200° C. in an argon (Ar) gas atmosphere, following which the mixtures are maintained for 1.5 hours in the temperature ranges indicated in Table II to complete the reaction. The several titanium tetrachlorides evolved at this time are condensed in the several cooled traps as colorless liquids.

(C) Resulting products

When the amounts of the impurities contained in the here obtained several titanium tetrachlorides were analyzed with an emission spectrophotometer, substantially no impure metallic constituents such as vanadium, iron, aluminum and lead were present. Thus it can be seen from the foregoing results that although the class of the phosphorus oxoacid component of the starting titanium salts of phosphorus oxoacids is varied satisfactory results are obtained in all cases without any great change in the temperature at which the titanium tetrachloride forms or its yield.

EXAMPLE 6

This example illustrates the procedure for preparing titanium tetrachloride from calcium chloride and titanium phosphate hydrogels wherein the mole ratio $TiO_2:P_2O_5$ has been varied.

(A) Preparation of titanium phosphate hydrogels of varying mole ratios

The free sulfuric acid content of a sulfuric acid solution of titanium salts containing impure metallic constituents, which was prepared in accordance with the procedure described in section A of Example 1, is adjusted to 10 grams per 100 ml. To 100 ml. each of this solution is added commercial first grade orthophosphoric acid in the amounts of respectively 2.1, 3.1, 3.6, 5.1, 15.0 and 30.0 milliliters, and homogeneous liquid blends are formed. Hydrogels of titanium phosphate of varying $TiO_2:P_2O_5$ mole ratios and containing substantially no impure metallic constituents are prepared from the foregoing liquid blends by operating as described in section A of Example 1. The mole ratios of the so prepared hydrogels of titanium phosphate are shown in Table III.

(B) Reaction of calcium chloride with the hydrogels of titanium phosphate of varying mole ratios in an argon (Ar) gas atmosphere The substantially purified hydrogels of titanium phosphate of varying mole ratios, prepared as hereinabove described, are mixed with calcium chloride ($CaCl_2 \cdot 2H_2O$) purified by the recrystallization technique. The two components are mixed in a ratio corresponding to 3 moles of the latter to one mole of the phosphoric acid portion (as $P_2O_5$) contained in the former, or 2 moles of the latter to one mole of the titanium portion (as $TiO_2$) contained in the former. Using water as the mixing medium, the two components are mixed intimately, after which the mixture is thoroughly dried in a 200° C. dryer and thereafter molded into flaky aggregates.

Thereafter the operation is carried out as described in section B of Example 1 by preheating the aggregates at 200° C. in an argon (Ar) gas atmosphere followed by maintaining a temperature range of 500–550° C. to complete the reaction. The several titanium tetrachlorides evolved at this time are collected separately in the several cooled traps as colorless liquids.

(C) Resulting products

When the yields or titanium tetrachloride at the several mole ratios of $TiO_2:P_2O_5$ of the starting titanium phosphate are studied, it is seen that satisfactory yields are had when the mole ratio $TiO_2:P_2O_5$ are in the range from 1:1.7 to 2:1 but that the yield becomes unsatisfactory at the mole ratios above 3.5:1. However, when the impurities contained in the here obtained several titanium tetrachlorides were analyzed with an emission spectrophotometer, none of them contained substantially any impure metallic constituents.

TABLE II

| Hydrogel of titanium salts of phosphorus oxoacid | | Reaction temperature (° C.) | Resulting titanium tetrachloride | | | | |
|---|---|---|---|---|---|---|---|
| Starting phosphorus oxoacid and derivative thereof | Mole Ratio $TiO_2:P_2O_5$ | | Yield percent | Impurities contained | | | |
| | | | | V | Fe | Al | Pb |
| Orthophosphoric acid ($H_3PO_4$) | 1.5:1 | 500–550 | 95.1 | | | | |
| Metaphosphoric acid ($HPO_3$) | 1.5:1 | 500–550 | 95.0 | | | | |
| Pyrophosphoric acid ($H_4P_2O_7$) | 1.5:1 | 500–550 | 94.5 | | | | |
| Sodium orthophosphate ($Na_2HPO_4 \cdot 12H_2O$) | 1.5:1 | 500–550 | 94.5 | | | | |
| Sodium metaphosphate ($NaPO_3$) | 1.6:1 | 500–550 | 92.5 | | | | |
| Sodium pyrophosphate ($Na_4P_2O_7$) | 1.4:1 | 500–550 | 95.5 | | | | |
| Calcium orthophosphate [$Ca_3(PO_4)_2$] | 1.4:1 | 500–550 | 96.0 | | | | |
| Ammonium orthophosphate [$(NH_4)_2HPO_4$] | 1.4:1 | 500–550 | 96.0 | | | | |
| Sodium tripolyphosphate ($Na_5P_3O_{10}$) | 1.5:1 | 500–550 | 96.5 | | | | |
| Sodium phosphite ($Na_2HPO_3$) | 1.2:1 | 500–550 | 93.5 | | | | |
| Phosphorous acid ($H_3PO_2$) | 1.2:1 | 500–550 | 93.3 | | | | |
| Phosphate rock | 1.5:1 | 500–550 | 97.0 | | | | |
| Crude phosphoric acid solution | 1.5:1 | 500–550 | 98.0 | | | | |

Further, when the several reaction residues remaining in the reaction tubes were calcined for one hour at 850° C. and X-ray diffraction patterns of these were studied, no oxides of titanium could be observed in the case of those whose yield was satisfactory, i.e., those whose $TiO_2:P_2O_5$ mole ratios were in the range of 2:1 to 1:1.7 but, on the other hand, the presence of the oxides of titanium in the titanium salt was observed in those cases where the mole ratios were above 3.5:1.

hour, the reaction is completed and titanium tetrachloride condenses in the cooled trap. The total recovery rate in this case is shown in Table IV. In the case of the titanium phosphate calcined at 700° and 900° C., the evolution of the titanium tetrachloride appears gradually starting at about 750° C. to become vigorous at about 800° C. When the temperature of 800–850° C. is maintained for one hour, the reaction is completed and the titanium tetrachloride condenses in the cooled traps.

TABLE III

| Starting Titanium Phosphate Hydrogel | | Amount added of Calcium Chloride | | Resulting Titanium Tetrachloride | | | | | X-Ray Diffraction Pattern of Residue Calcined for 1 hr. at 850° C. |
|---|---|---|---|---|---|---|---|---|---|
| Amount of Phosphoric Acid Added at Time of (ml.) | Mole Ratio of Composition of Gel Formed ($TiO_2:P_2O_5$) | $CaCl_2/TiO_2$ (Mole Ratio) | $CaCl_2/P_2O_5$ (Mole Ratio) | Yield (percent) | \multicolumn{4}{c}{Impurity Contained} | |
| | | | | | V | Fe | Al | Pb | |
| 2.1 | 7.3:1 | 2 | | 52.5 | | | | | } Anatase apatite. |
| | | | 3 | 18.5 | | | | | |
| 3.1 | 5.3:1 | 2 | | 76.4 | | | | | } Do. |
| | | | 3 | 26.5 | | | | | |
| 3.6 | 4.4:1 | 2 | | 80.2 | | | | | } Do. |
| | | | 3 | 31.0 | | | | | |
| 5.1 | 3.5:1 | 2 | | 93.0 | | | | | } Do. |
| | | | 3 | 37.0 | | | | | |
| 7.5 | 2.0:1 | 2 | | 94.5 | | | | | } Apatite. |
| | | | 3 | 60.5 | | | | | |
| 15.0 | 1.5:1 | 2 | 3 | 95.1 | | | | | } Do. |
| 24.0 | 1:1 | 2 | | 94.0 | | | | | } Do. |
| | | | 3 | 97.0 | | | | | |
| 30.0 | 1:1.7 | 2 | | 98.0 | | | | | } Do. |
| | | | 3 | 98.5 | | | | | |

EXAMPLE 7

This example illustrates the procedure for preparing titanium tetrachloride using as the starting materials a xerogel of titanium phosphate and by way of comparison its calcined product.

As starting materials are used xerogels obtained by heating and drying for one hour at respectively 300° and 400° C. a wet gel of titanium phosphate prepared in accordance with the procedure described in section A of Example 1 and containing substantially no impure metallic constituents, and calcined products of titanium phosphate obtained by calcining for one hour at respectively 500°, 700° and 900° C. the foregoing wet gel of titanium phosphate. The several titanium phosphates $$(1.5\ TiO_2 \cdot P_2O_5)$$

are blended fully intimately with calcium chloride in a ratio of about 3 moles of the latter to one mole of the former, using water as the blending medium, following which the blends are thoroughly dried in a 200° C. air bath and formed into flaky aggregates.

The reaction of the here obtained several blended dried products are carried out using the reaction apparatus as described in section B of Example 1 and by operating similarly in an argon (Ar) gas atmosphere. First, the blends are preheated at 200° C. following which the temperature of heating is raised. At this time, in the case of the xerogels of titanium phosphate which had been heated and dried at 300° and 400° C., the evolution of titanium tetrachloride appears gradually at about 400° C. and the evolution becomes vigorous upon reaching 600° C. When the temperature is maintained at 600–650° C. for 2 hours, the reaction is completed, and titanium tetrachloride is condensed in the cooled traps as colorless liquids. The recovery rates are shown in Table IV. On the other hand, in the case of the calcined product of titanium phosphate which had been calcined at 500° C., the evolution of titanium tetrachloride gradually appears starting at about 450° C. While the evolution of the titanium tetrachloride becomes temporarily vigorous in at about 600° C., thereafter the evolution becomes temporarily less upon passing 650° C. The rate of recovery of the titanium portion at this time is about 32%. When further heating is carried out, the evolution of titanium tetrachloride again is seen at about 750° C. and becomes intensely active upon reaching about 800° C. When this temperature is maintained for one hour, the reaction is completed and titanium tetrachloride condenses in the cooled trap.

TABLE IV

| Temperature at which Titanium Phosphate was Heated or Calcined (° C.) | Temperature at which Evolution of Titanium Tetrachloride Becomes Intensely Vigorous (° C.) | Recovery Rate of Titanium Portion (percent) | Composition (Atomic Ratio) of Recovered Titanium Tetrachloride (Ti:Cl) |
|---|---|---|---|
| 300 | 600–650 | 93.0 | 1:4.20 |
| 400 | 600–650 | 93.0 | 1:4.20 |
| 500 | { 600–650  750–830 | >89.0 | 1:4.20 |
| 700 | 780–850 | 84.0 | 1:4.25 |
| 900 | 780–850 | 82.5 | 1:4.25 |

As is apparent from the foregoing results, whereas in the case of the xerogels of titanium phosphate (products heated and dried at 300° and 400° C.) the reaction is completed at temperatures up to about 650° C., a temperature lower than the melting point of calcium chloride (772° C.), in the case of the calcined products the reaction of a part of that calcined at 500° C. and all of that calcined at 700° and 900° C. are not completed until a temperature of above 780° C. a temperature higher than the melting point of calcium chloride, to a temperature at about 850° C. is reached. Further, there is a tendency to a decline in recovery rate of the titanium portion. In addition, when heating is carried out to above the melting point of calcium chloride, the material blend becomes a viscous liquid or semi-solid state during the reaction. And when it is attempted to remove the reaction residue phosphate after the reaction, the residue adheres to the reactor in a sintered state to damage the reactor.

Hence, it can be understood that for recovering titanium tetrachloride in good yield and without troubles it is necessary to follow the invention and use in accordance therewith either a hydrogel or xerogel of titanium phosphate and moreover carry out the reaction by heating the solid mixture at a temperature lower than the melting point of calcium chloride.

EXAMPLE 8

This example illustrates the instance of preparing titanium halides using the various halides of alkaline earth metals.

As the starting titanium salt of phosphorus oxoacid was used the hydrogel of titanium phosphate (mole ratio of $TiO_2:P_2O_5$ 1.51:1, water content 74%) containing substantially no impure metallic constituents, prepared in accordance with the procedure described in section A of Example 1.

As the halides, the secondary starting material, the various halides indicated in Table V were chosen. These halides were all those which had been purified to qualify as reagent first grade.

The two components of the hydrogels of titanium phosphate and the halides were intimately blended to paste form using water as the mixing medium, following which the blends were thoroughly dried using a dryer or desiccator to obtain dried blends in small aggregate form. The ratio in which the titanium phosphate and halide were mixed in this case was a ratio corresponding to about 4 atoms of halogen of the halide to one atom of Ti in the titanium phosphate.

The reactions were carried out using as the reaction apparatus a vertical type reaction apparatus equipped with a cooling apparatus for collecting the titanium halide, as described in section B of Example 1, and by introducing argon (Ar) gas to the foregoing apparatus as the non-oxidizing atmosphere. The reactions were completed at the temperatures indicated in Table V and the titanium halides evolving at that time were collected.

When the collected titanium halides were analyzed, the results shown in Table V were obtained. Further, when the impurities contained were analyzed using an emission spectrophotometer, it can be seen that substantially no impure metallic constituents were present.

TABLE V

| Halide | Temperature at which Intensely Vigorous Evolution of Titanium Halide is Seen (° C.) | Recovery Rate of Titanium Portion (percent) | Composition (atomic ratio) of Recovered Titanium Tetrahalide (Ti:Hal) |
|---|---|---|---|
| $MgCl_2$ | 500–550 | 93.0 | 1:4.09 |
| $Mg(OH)Cl$ | 150–350 | 90.0 | 1:4.01 |
| $MgBr_2$ | 550–650 | 93.5 | 1:4.28 |
| $MgI_2$ | 550–600 | 94.0 | 1:4.30 |
| $BaCl_2$ | 830–900 | 93.5 | 1:4.35 |
| $SrCl_2$ | 780–850 | 92.0 | 1:4.30 |

EXAMPLE 9

This example illustrates the instances where the reaction between the hydrogel of titanium phosphate and calcium chloride is carried out in various non-oxidizing atmospheres.

As the starting hydrogel of titanium phosphate was used the wet gel of titanium phosphate containing substantially no impure metallic constituents (mole ratio of $TiO_2:P_2O_5$ 1.51:1, water content 74%), which was prepared by the procedure described in section A of Example 1. Fifty grams of calcium chloride ($CaCl_2 \cdot 2H_2O$) obtained by the recrystallization technique were mixed with one hundred grams of the said titanium phosphate hydrogel as described in section B of Example 1, and a homogeneous dried blend was obtained. Next, using the vertical type reaction apparatus as described in section B of Example 1, the reactions were carried out by depositing the foregoing blend atop the perforated plate of the reaction tube and, while fully passing through the various non-oxidizing atmospheres ($N_2$, $Cl_2$, $CO_2$, $CH_4$) indicated in Table VI, heating in each case to 450–600° C. to complete the reaction. The titanium tetrachloride evolving in each instance was collected in the cooled trap.

The titanium tetrachlorides collected by reacting under the various non-oxidizing atmospheres, when analyzed, gave the results shown in Table VI. Further, when the impurities contained were analyzed using an emission spectrophotometer, it was seen that substantially no impure metallic constituents were present.

TABLE VI

| Non-oxidizing Atmosphere | | Resulting Titanium Tetrachloride | | | | | |
|---|---|---|---|---|---|---|---|
| Class | Rate of Flow (cc./min.) | Atomic Ratio (Ti:Cl) | Impurities Contained | | | | Remarks |
| | | | V | Fe | Al | Pb | |
| $N_2$ | 150 | 1:4.35 | | | | | |
| $Cl_2$ | 100 | 1:4.55 | | | | | The rate of formation of titanium tetrachloride was fast. |
| $CO_2$ | 150 | 1:4.30 | | | | | Thorough heating was carried out in the gas preheating apparatus. |
| $CH_4$ | 200 | 1:4.20 | | | | | Thorough heating was carried out in the gas preheating apparatus, slight decomposition of $CH_4$ gas and its turning to coke was observed. |

EXAMPLE 10

This example illustrates the instance where titanium tetrachloride is prepared by varying the mixture ratio of the starting hydrogen of titanium phosphate and calcium chloride.

Solid blends were prepared in accordance with the procedure described in section B of Example 1 from a hydrogen of titanium phosphate (mole ratio of $$TiO_2:P_2O_5 \; 1.51:1$$

water content 74%) containing substantially no impure metallic constituents, which was prepared in accordance with the procedure described in section A of Example 1, and calcium chloride ($CaCl_2 \cdot 2H_2O$) purified by the recrystallization technique. In mixing the two components the mole ratio was varied using 5, 4, 3 and 2 moles of the $CaCl_2 \cdot 2H_2O$ to one mole of the 1.5 $TiO_2 \cdot P_2O_5$.

Thirty grams each of the here prepared blends were deposited on the perforated plate inside the reaction tube of the vertical type reaction apparatus described in section B of Example 1, after which, in accordance with the operation described in section B of Example 1, the reaction was carried to completion by heating the blends to a temperature of 500°–550° CC. in an argon (Ar) gas atmosphere. Each of the colorless titanium tetrachlorides was recovered in the cooled traps.

When the titanium tetrachlorides obtained by reacting the blends prepared in various mixture ratios were analyzed, the results shown in Table VII were obtained.

TABLE VII

| Mole ratio of mixture | Composition ratio of resulting titanium tetrachloride (Ti:Cl) | Time required for completion of reaction (min.) |
|---|---|---|
| 5 | 1:4.55 | 45 |
| 4 | 1:4.45 | 55 |
| 3 | 1:4.34 | 60 |
| 2 | 1:4.02 | 90 |

We claim:

1. A process for preparing titanium halides which comprises mixing a hydrogen or xerogel of titanium salts of phosphorus oxoacids with at least one halide of an alkaline earth metal, heating said mixture in the solid phase in a non-oxidizing atmosphere at temperature ranging from 300° C. to below the melting point of said alkaline earth metal halide or halides and for a period of time sufficient to form a halide of titanium, and thereafter recovering the evolving vapor of the titanium halide.

2. The process according to claim 1 wherein said titanium salt of phosphorus oxoacids has a composition ratio in the range of $TiO_2:P_2O_5=1:0.3-3$ based on the oxides.

3. The process according to claim 1 wherein said halide of alkaline earth metals is selected from the group consisting of the chlorides, bromides and iodides of alkaline earth metals.

4. The process according to claim 1 wherein said halide of alkaline earth metals is mixed with said hydrogel or xerogel of titanium salts of phosphorus oxoacids in a sufficient amount such that the halogen atom is at least 4 equivalents for every one atom of the titanium.

5. The process according to claim 1 wherein the solid phase mixture is formed by mixing said hydrogel or xerogel of titanium salts of phosphorus oxoacids with said halide of an alkaline earth metal intimately in the presence of water and thereafter drying said mixture at a temperature not exceeding 400° C.

6. The process according to claim 1 wherein the solid phase mixture is formed by mixing a hydrosol of titanium salts of phosphorus oxoacids with said halide of an alkaline earth metal intimately and thereafter drying said mixture at a temperature not exceeding 400° C.

7. The process according to claim 1 wherein said mixture is heated in the solid phase under circulation of an inert gas and said titanium halide is recovered by cooling the vapor of the titanium halide to a temperature ranging between −50° C. and room temperature.

8. The process according to claim 1 wherein the non-oxidizing atmosphere is of an inert gas selected from the group consisting of argon, nitrogen, carbon dioxide, hydrogen and halogen.

References Cited

UNITED STATES PATENTS 2,608,464  8/1952  Aagaard et al. _____ 23—87

EDWARD STERN, Primary Examiner

U.S. Cl. X.R.

23—105, 108